(12) United States Patent
Cha et al.

(10) Patent No.: US 7,460,336 B1
(45) Date of Patent: Dec. 2, 2008

(54) SLIDER DESIGN INCLUDING STICTION REDUCTION PADS

(75) Inventors: Ellis T. Cha, San Jose, CA (US); Zhu Feng, Fremont, CA (US)

(73) Assignee: SAE Magnetics (H.K.) Ltd., Shatin, N.T. (HK)

( * ) Notice: Subject to any disclaimer, the term of this patent is extended or adjusted under 35 U.S.C. 154(b) by 0 days.

(21) Appl. No.: 09/566,685

(22) Filed: May 8, 2000

Related U.S. Application Data (60) Provisional application No. 60/132,978, filed on May 7, 1999.

(51) Int. Cl.
*G11B 17/32* (2006.01)

(52) U.S. Cl. ................................... 360/235.8

(58) Field of Classification Search .............. 360/235.8, 360/235.5, 235.4, 236.6, 234.3, 246.2, 237
See application file for complete search history.

(56) References Cited

U.S. PATENT DOCUMENTS

| | | | |
|---|---|---|---|
| 5,267,104 A * | 11/1993 | Albrecht et al. .......... | 360/97.02 |
| 5,285,337 A * | 2/1994 | Best et al. ................ | 360/97.02 |
| 6,229,671 B1 * | 5/2001 | Boutaghou et al. ....... | 360/235.1 |
| 6,236,543 B1 * | 5/2001 | Han et al. ................ | 360/236.6 |
| 6,246,538 B1 * | 6/2001 | Kasamatsu et al. ....... | 360/97.01 |
| 6,252,742 B1 * | 6/2001 | Kameyama ................ | 360/237 |
| 6,373,661 B1 * | 4/2002 | Tokuyama et al. ....... | 360/236.6 |
| 6,396,661 B1 * | 5/2002 | Yokohata et al. ........... | 360/135 |
| 6,396,664 B2 * | 5/2002 | Koishi et al. ............. | 360/235.8 |
| 6,535,353 B2 * | 3/2003 | Boutaghou et al. ....... | 360/235.1 |
| 6,538,849 B1 * | 3/2003 | Fayeulle et al. .......... | 360/236.3 |
| 6,583,961 B2 * | 6/2003 | Levi et al. ................ | 360/236.8 |
| 6,603,639 B1 * | 8/2003 | Polycarpou et al. ...... | 360/235.8 |
| 6,624,977 B1 * | 9/2003 | Boutaghou ............... | 360/235.2 |
| 6,687,088 B1 * | 2/2004 | Boutaghou et al. ....... | 360/234.3 |
| 7,130,154 B2 * | 10/2006 | Otsuka et al. ............. | 360/237 |

FOREIGN PATENT DOCUMENTS

JP 11016315 * 1/1999

* cited by examiner

*Primary Examiner*—Angel A. Castro
(74) *Attorney, Agent, or Firm*—Kenyon & Kenyon LLP (57) ABSTRACT

An improved slider design with stiction reduction pads is presented along with a method of making the same. In one embodiment, the bases for the stiction reduction pads are made first during an etching process for the air bearing surfaces, then the stiction reduction pads are made higher so as to prevent unwanted contacted between the air bearing surface and the disc as well as reducing meniscal forces that can be caused by a lubricant on the disc.

18 Claims, 10 Drawing Sheets

SLIDER DESIGN INCLUDING STICTION REDUCTION PADS

RELATED APPLICATIONS

This application claims priority to the extent available (including under 35 U.S.C. §119(e)(1)) to provisional application No. 60/132,978 filed May 7, 1999.

FIELD OF THE INVENTION

The present invention is directed to slider designs in disk drives. More particularly, the present invention pertains to a slider design including stiction reduction pads.

BACKGROUND OF THE INVENTION

Hard disk drives are common information storage devices essentially consisting of a series of rotatable disks that are accessed by magnetic reading and writing elements. These data transferring elements, commonly known as transducers, are typically carried by and embedded in a slider body that is held in a close relative position over discrete data tracks formed on a disk to permit a read or write operation to be carried out. In order to properly position the transducer with respect to the disk surface, an air bearing surface (ABS) formed on the slider body experiences a fluid air flow that provides sufficient lift force to "fly" the slider and transducer above the disk data tracks. The high speed rotation of a magnetic disk generates a stream of air flow or wind along its surface in a direction substantially parallel to the tangential velocity of the disk. The air flow cooperates with the ABS of the slider body which enables the slider to fly above the spinning disk. In effect, the suspended slider is physically separated from the disk surface through this self-actuating air bearing. The ABS of a slider is generally configured on the slider surface facing the rotating disk, and greatly influences its ability to fly over the disk under various conditions.

Once the disk stops rotating, the slider comes to rest on the surface of the disk When the rotation of the disk begins again, the air-bearing is formed once again and the slider separates from the disk. This process is typically called contact-start-stop (CSS). In order to reduce friction between the slider and the disk, a very thin layer of lubricant on the order of a few nanometers, is applied onto the surface of the disk. One of the problems with CSS operations, is the effect of starting friction ("stiction"). Stiction is caused by a meniscus of lubricant formed between the slider and the disk that clamps the slider down to the media. In some cases, especially in a humid environment, the slider is held down strong enough that the disk fails to rotate. To correct this problem, pads are introduced onto the surface of the slider to reduce the area of contact between the slider and the disk. The pads are extremely tall to minimize the meniscal problem described above.

SUMMARY OF THE INVENTION

The present invention provides an air bearing slider with an improved pad structure and a method of manufacturing such a structure. According to an embodiment of the present invention, the air-bearing surface and a base portion of the stiction reduction pad are formed during a first etching step. Then the structure can be made higher by adding additional material (e.g., a second DLC layer and a second adhesion layer) to the structure. The stiction reduction pad preferably prevents contact between the air-bearing surface and the disk or media as well as the lubricant on the disk or media. The stiction reduction pad also preferably reduces stiction forces between the slider and the disk or media.

DETAILED DESCRIPTION OF THE INVENTION

Figure 1A:
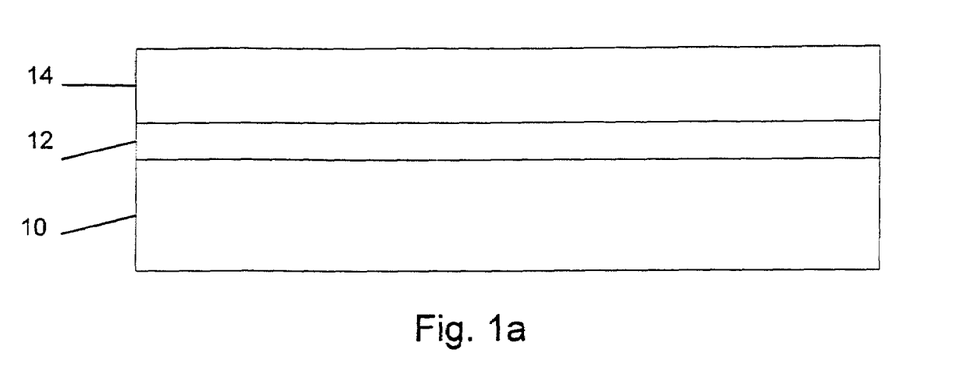
FIGS. 1a-c are cross sectional views of a slider at intermediate points of a method according to an embodiment of the preset invention.
Figure 1B:
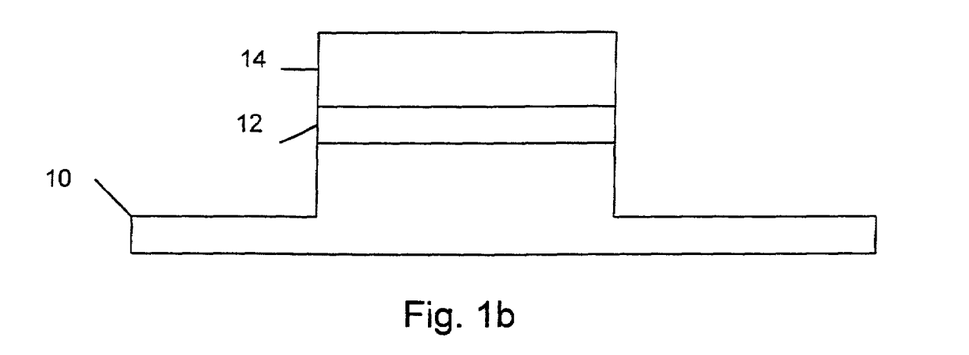
Figure 1C:
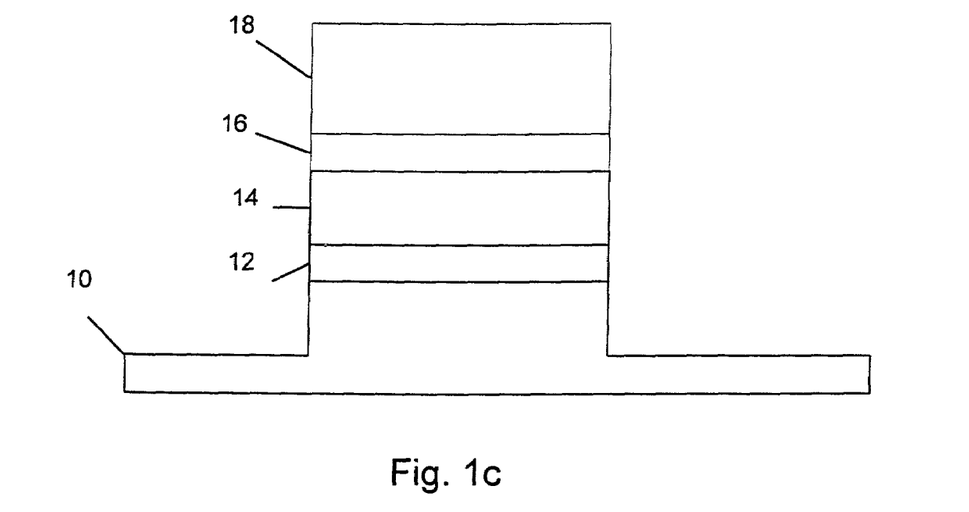

Referring to FIG. 1, a series of cross-sections are shown of an air-bearing slider after various intermediate steps of a method according to an embodiment of the present invention. In FIG. 1a, the initial configuration is shown including a slider body 10, for example made of $Al_2O_3TiC$, an adhesion layer 12 (e.g., Si or $SiO_x$), and a DLC (diamond-like carbon) layer 14. This structure is then masked in a known manner so that portions of the structure are exposed during an etching operation. The resulting structure is shown in FIG. 1b. According to an embodiment of the present invention, the stiction reduction pads are etched at the same time as the air-bearing surfaces using an ion milling or reactive ion etching process. In other words, the stiction reduction (SR) pads and the air bearing surfaces are masked out together during the etching process. After the etching process, the SR pads have a height on the order of 25 microinches or less in this example.

According to a first embodiment of the present invention, the stiction reduction pad is increased in height by first adding a second adhesion layer 16 (e.g., using a mask and sputtering method), which may or may not be necessary. Then a second DLC layer 18 is added. The second DLC layer 18 can be sputtered onto the stiction reduction pad structure by using a metal mask technology such as disclosed in U.S. Pat. No. 5,768,055 (the disclosure of which is hereby incorporated by reference in its entirety) or with traditional photolithographic techniques (such as the so-called "etched-back" or "lift-off" process). The completed structure according to this embodiment of the invention is shown in FIG. 1c. After building up the structure, the SR pads may have a height as short as 50 A but preferably on the order of 250 A to 400 A (Angstroms) over and above the height of the SR pad shown in FIG. 1b. By building the SR pads higher, there is a reduction in meniscus forces caused by the lubricant, which usually has a thickness on the order of 15-50 A. In this embodiment, the width dimensions of the pad are uniform between the first and second DLC layers, but the present invention is not limited in this manner. In this example, the pads have a diameter of between 25 and 60 micrometers.

Figure 2:
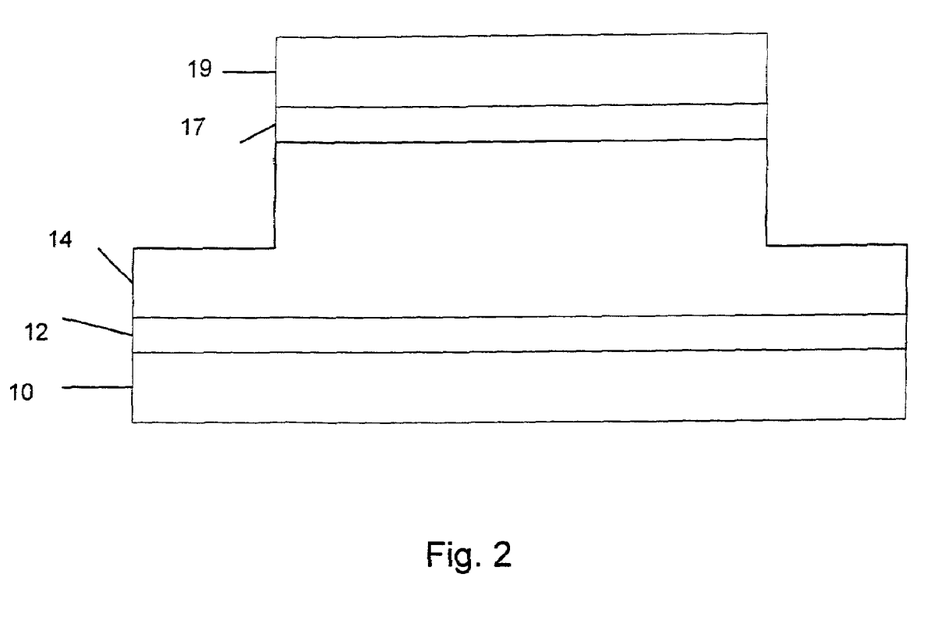
FIG. 2 is a cross-section of a slider showing an alternative embodiment of the stiction reduction pad of the present invention.

According to a second embodiment of the present invention, as shown in FIG. 2, the second DLC layer may have dimensions that are different from the first DLC layer. In this embodiment, the first DLC layer 14 is only partially etched. A second adhesion layer 17, which may or may not be necessary, and a second DLC layer 19 are deposited on top of the first DLC layer as described above.

Building the SR pads in the above-described manner, can help to insure that none of the air-bearing surface comes into contact with the disk or media (or the lubricant layer on the disk or media). By providing a small surface area of contact for the SR pads, stiction forces between the slider and the disk or media are reduced. In addition to reducing stiction forces, the SR pads also reduce dynamic or running friction when the slider is moving relative to a rotating disk.

In an alternative embodiment of the present invention, the first DLC layer and the first adhesion layer may be dispensed with and the SR pad can be built directly onto the slider body. Use of the SR pad of the present invention with various different slider configurations will be described in further detail below.

Figure 3:
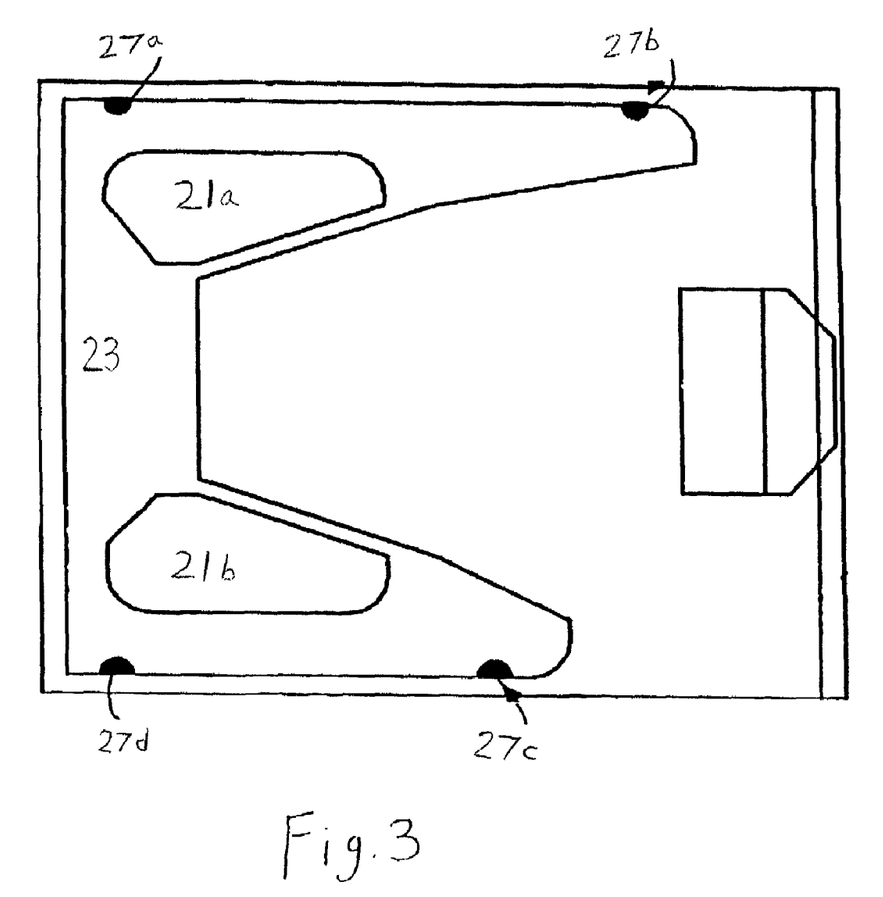
FIG. 3 is a bottom plan view of a first slider including stiction reduction pads constructed according to an embodiment of the present invention.

Referring to FIG. 3, a first slider design is shown that includes first and second ABS surfaces 21a, 21b. A shallow step area 23 is present which surrounds the ABS structures. Four SR pads 27a-d are provided, constructed according to the methods described above. In this embodiment, each SR pad is built upon the shallow step area 23 and has a semi-circle cross-sectional shape. The flat, side portion of the SR pad is co-planar with a side edge of the shallow step area.

Figure 4:
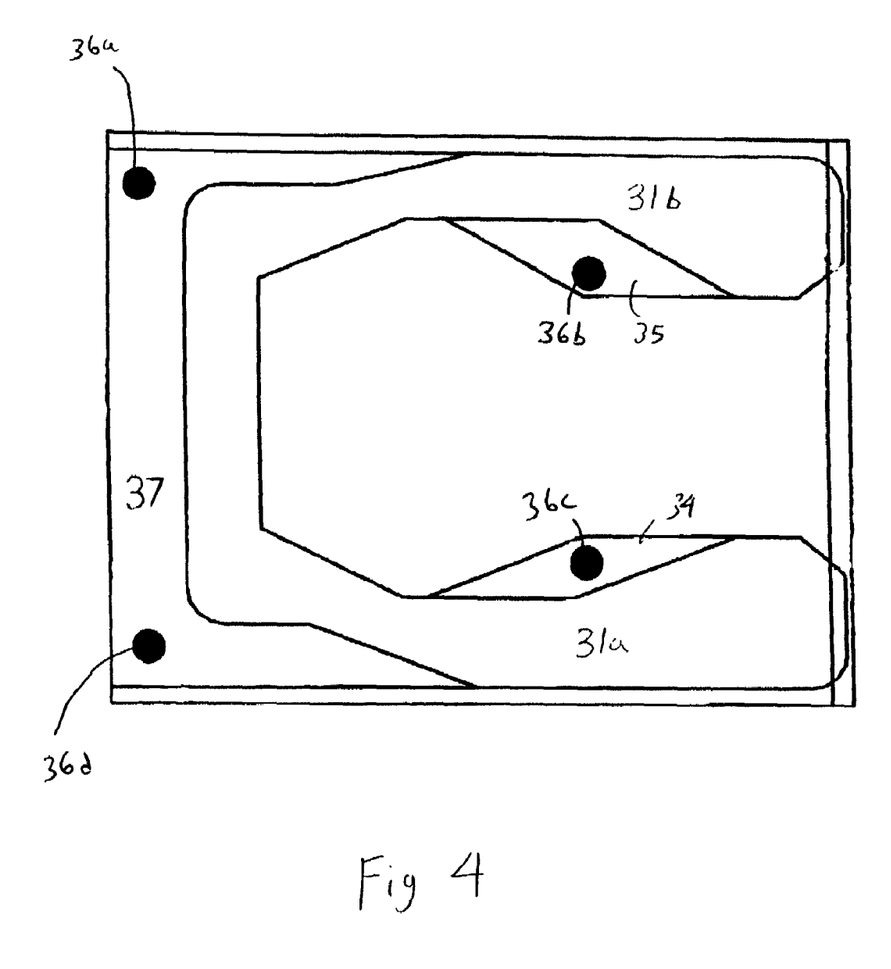
FIG. 4 is a bottom plan view of a second slider including stiction reduction pads constructed according to an embodiment of the present invention.

Referring to FIG. 4, a second slider design is shown that includes first and second air-bearing surface (ABS) rails 31a, 31b. The slider also includes a shallow leading edge step 37 as well as two intermediate "wings" 34, 35 at the inside edges of the rails 31a, 31b. In this embodiment, the leading edge 37 and the wings 34, 35 are etched to a substantially similar depth. Using the methods described above, the SR pads 36a-d are formed with a cylindrical shape.

Figure 5:
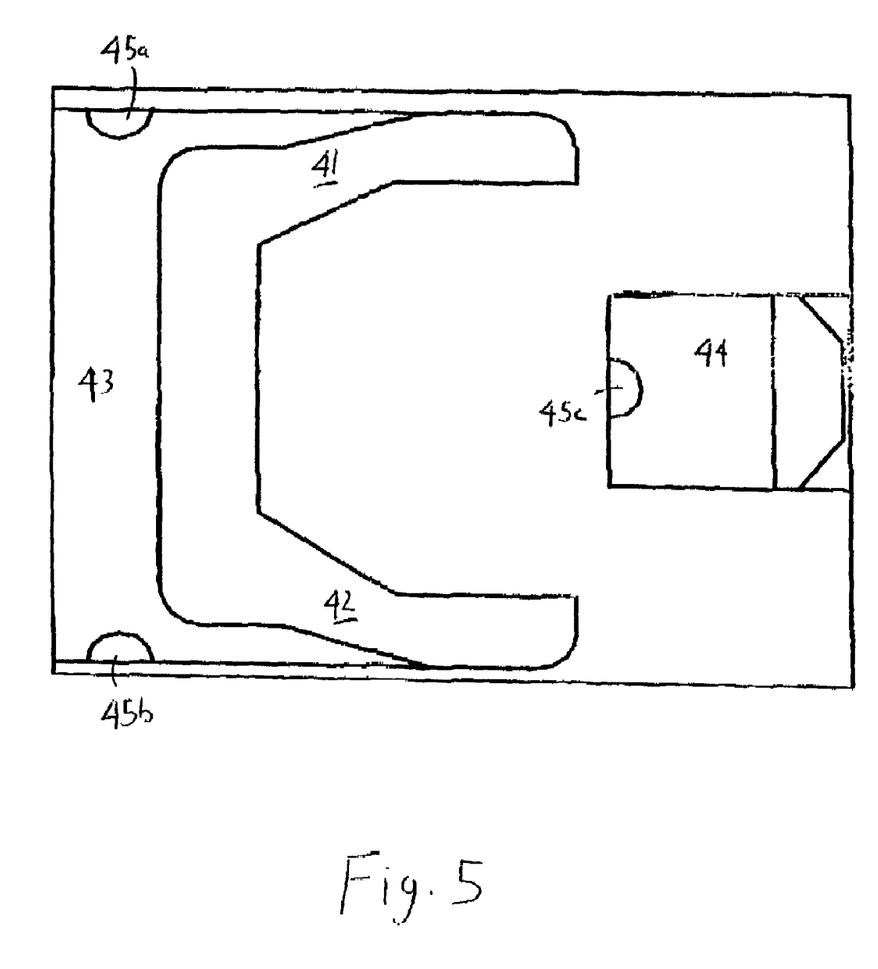
FIG. 5 is a bottom plan view of a third slider including stiction reduction pads constructed according to an embodiment of the present invention.

Referring to FIG. 5, a third slider design is shown that includes first and second ABS rails 41, 42 as well as a leading edge step 43. A rear pad 44 is also provided which is etched to the same depth as the leading edge step 43. Three SR pads 45a-c are provided—two on the leading edge step 43 and one at the rear pad 44 using the methods described above. In this embodiment, the SR pads have a cylindrical shape with the exception of 45c which has a semi-circular shape.

Figure 6:
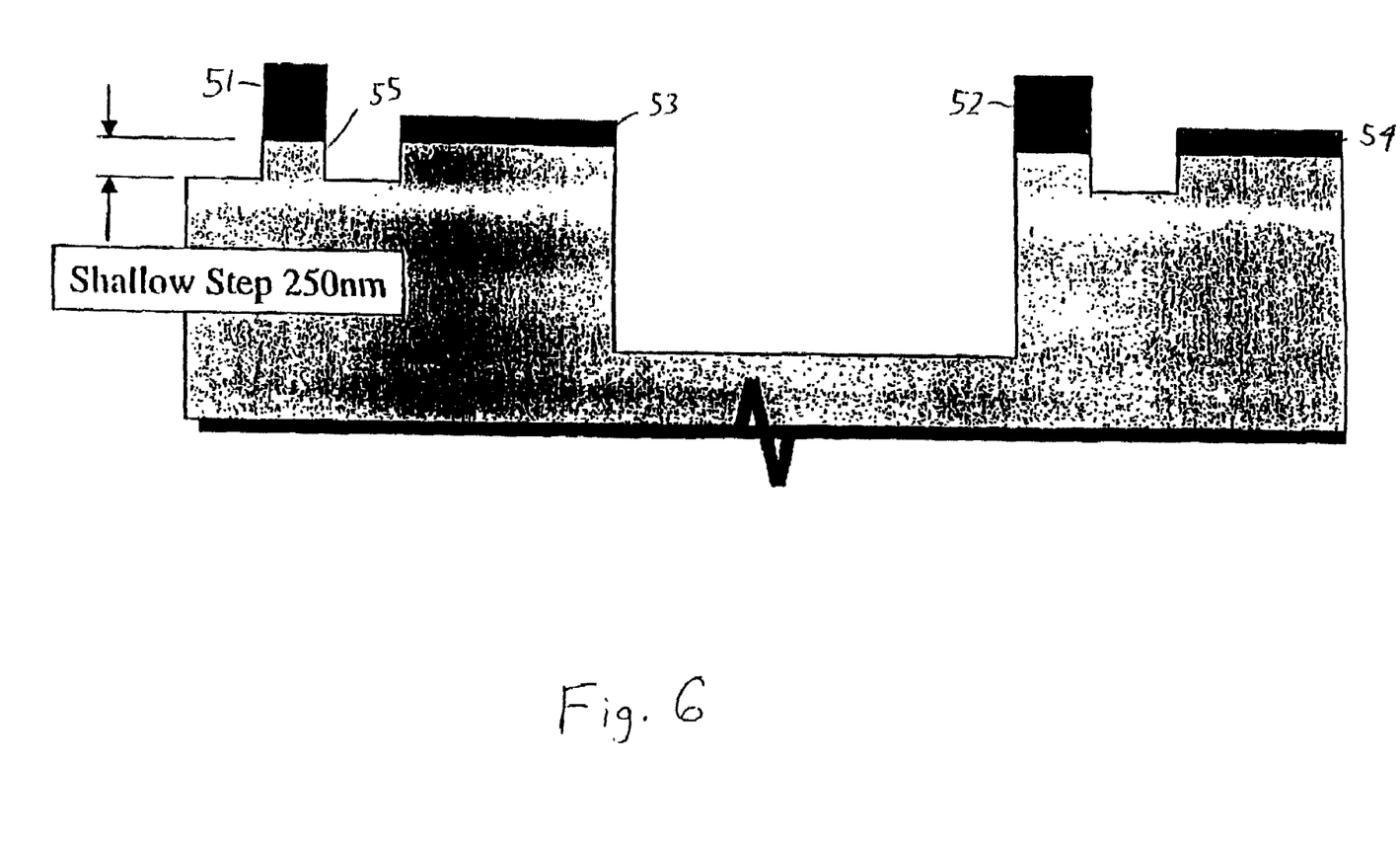
FIG. 6 is a cross-section of a fourth slider including stiction reduction pads constructed according to an embodiment of the present invention.

Referring to FIG. 6, a cross section of a slider design is shown. As seen in FIG. 6, the SR pads 51 and 52 extend above the level of the ABS surfaces 53 and 54, respectively. In this embodiment, the SR pads are placed on top of a shallow step 55 (e.g., of 250 nm).

Figure 7:
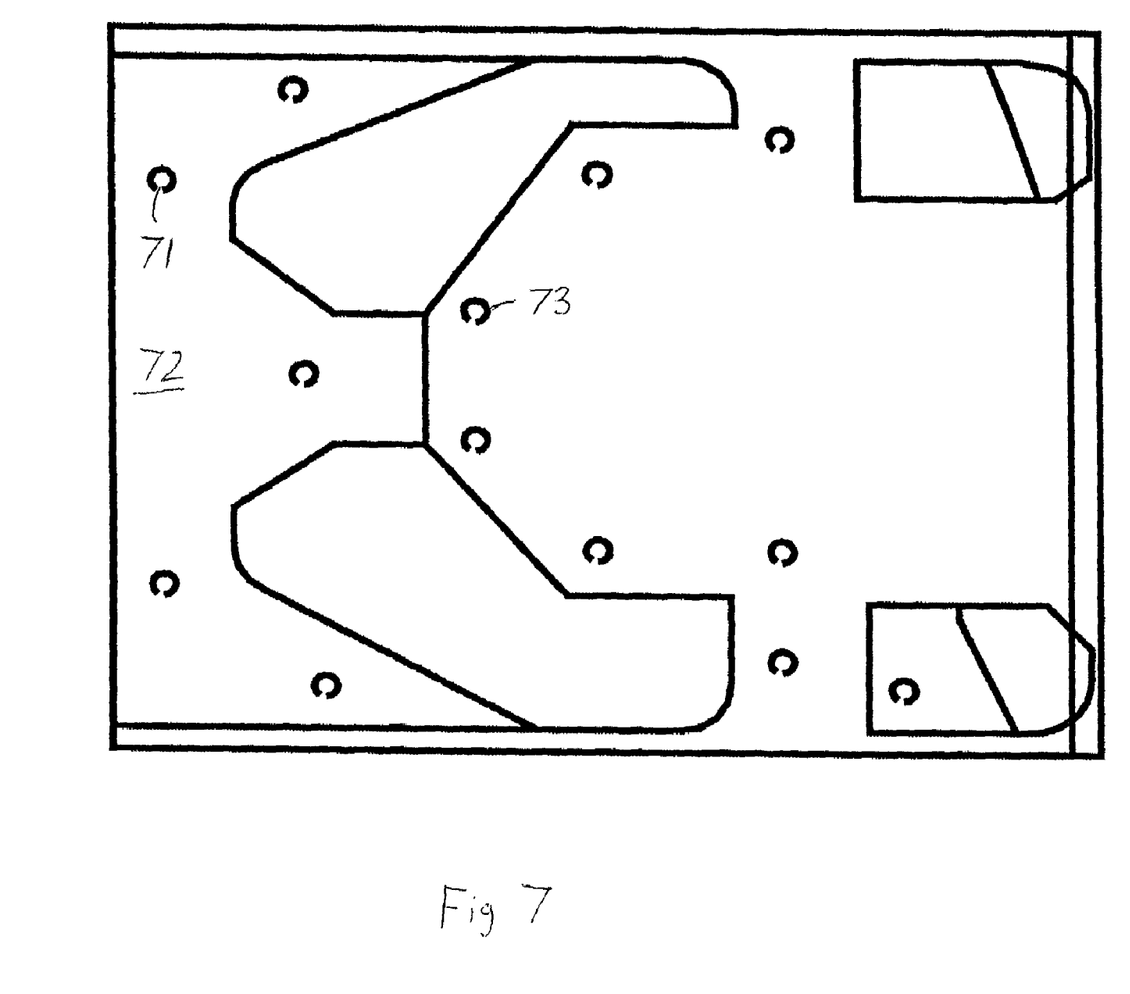
FIG. 7 is a bottom plan view of a fifth slider including stiction reduction pads constructed according to an embodiment of the present invention.
Figure 8:
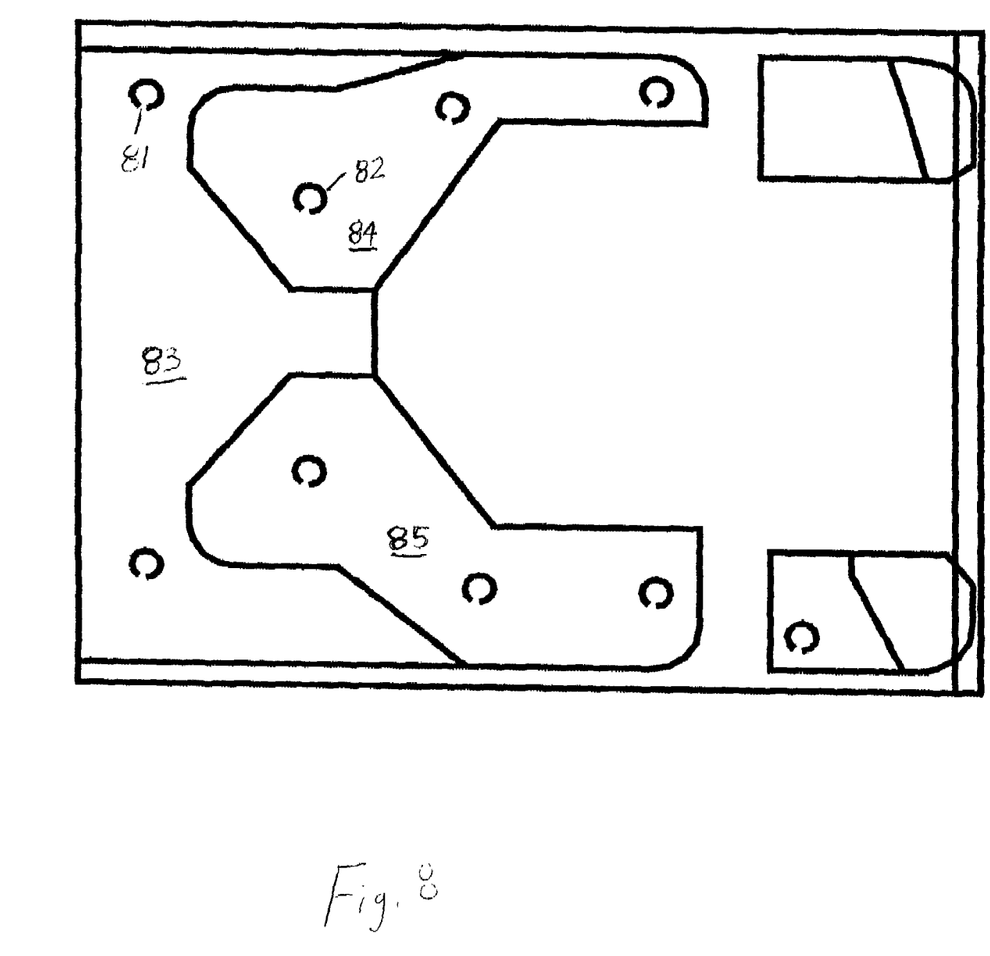
FIG. 8 is a bottom plan view of a sixth slider including stiction reduction pads constructed according to an embodiment of the present invention.

The stiction reduction pads may be placed on the ABS surface, itself, and/or in the cavity (e.g., a subambient pressure cavity adjacent to the ABS surface. Referring to FIG. 7, a bottom view of a slider is shown where stiction reduction pads (e.g., pad 71) are placed in a leading edge step 72 of the slider. Stiction reduction pads (e.g., pad 73) may also be placed in the sub-ambient pressure cavity between the ABS surfaces. Referring to FIG. 8, another slider is shown where the stiction pads 81, 82 are placed in a leading edge step 83 of the slider as well as on the ABS surfaces 84, 85.

In general, the placement of stiction reduction pads constructed according to the present invention are optimally placed when taking into account several rules. First, the height of the stiction reduction pad should be high enough from its base so as to avoid stiction due to miniscal forces. Generally, the height of each stiction reduction pad should be between 50 and 400 A. Second, the stiction reduction pad should not interfere with the flight of the slider. Accordingly, the width or area dimension of the pad should be small enough (e.g., a circle having a diameter between 25 and 60 micrometers) to prevent it from providing an air bearing surface for the slider, and to prevent it from having a large contact area. Also, the height of the pads should be controlled so that they do not contact the disk during slider flight. Third, the magnetic head must be the lowest point of the slider during flight. This requires that stiction reduction pads be placed towards the leading edge of the slider to take advantage of the pitch angle of the slider. In doing so, however, the slider may tip backward causing stiction instability. To avoid this stiction instability while keeping the magnetic transducer the lowes point during flying, the pad location and the pitch and the roll angles of the slider must be optimized. Otherwise, the slider could tip over during a stop operation leading to contact between the air bearing surface and the disk and increased stiction forces. With this criteria, the stiction reduction pads of the present invention should be able to keep starting friction at a minimum; avoid large stiction problems caused by contact between the air bearing surface and the disk; and maintain flying height stability for the slider.

Figure 9:
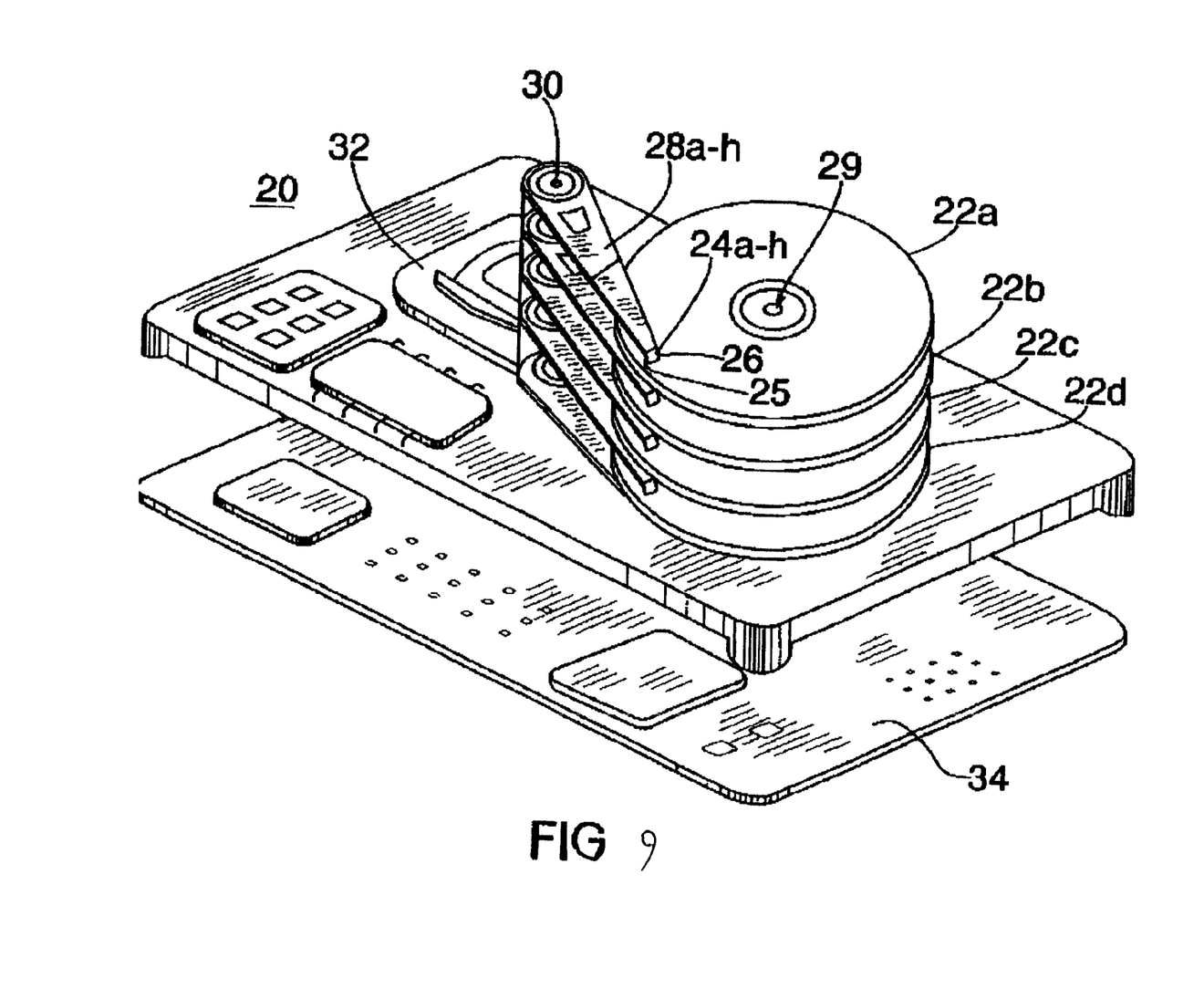
FIG. 9 is a diagram of a disk drive incorporating a slider designed according to an embodiment of the present invention.

Referring to FIG. 9, there is illustrated an example of a disk drive designated generally by the reference numeral 20 that may include the slider design of the present invention. The disk drive 20 includes a stack of storage disks 22a-d and a stack of read/write heads 24a-h. Each of the storage disks 22a-d is provided with a plurality of data tracks to store user data. As illustrated in FIG. 9, one head is provided for each surface of each of the disks 22a-d such that data can be read from or written to the data tracks of all of the storage disks. The heads are coupled to a pre-amplifier. It should be understood that the disk drive 20 is merely representative of a disk drive system utilizing the present invention and that the present invention can be implemented in a disk drive system including more or less storage disks.

The storage disks 22a-d are mounted for rotation by a spindle motor arrangement 29, as is known in the art. Moreover, the read/write heads 24a-h are supported by respective actuator arms 28a-h for controlled positioning over preselected radii of the storage disks 22a-d to enable the reading and writing of data from and to the data tracks. To that end, the actuator arms 28a-h are rotatably mounted on a pin 30 by a voice coil motor 32 operable to controllably rotate the actuator arms 28a-h radially across the disk surfaces.

Figure 10:
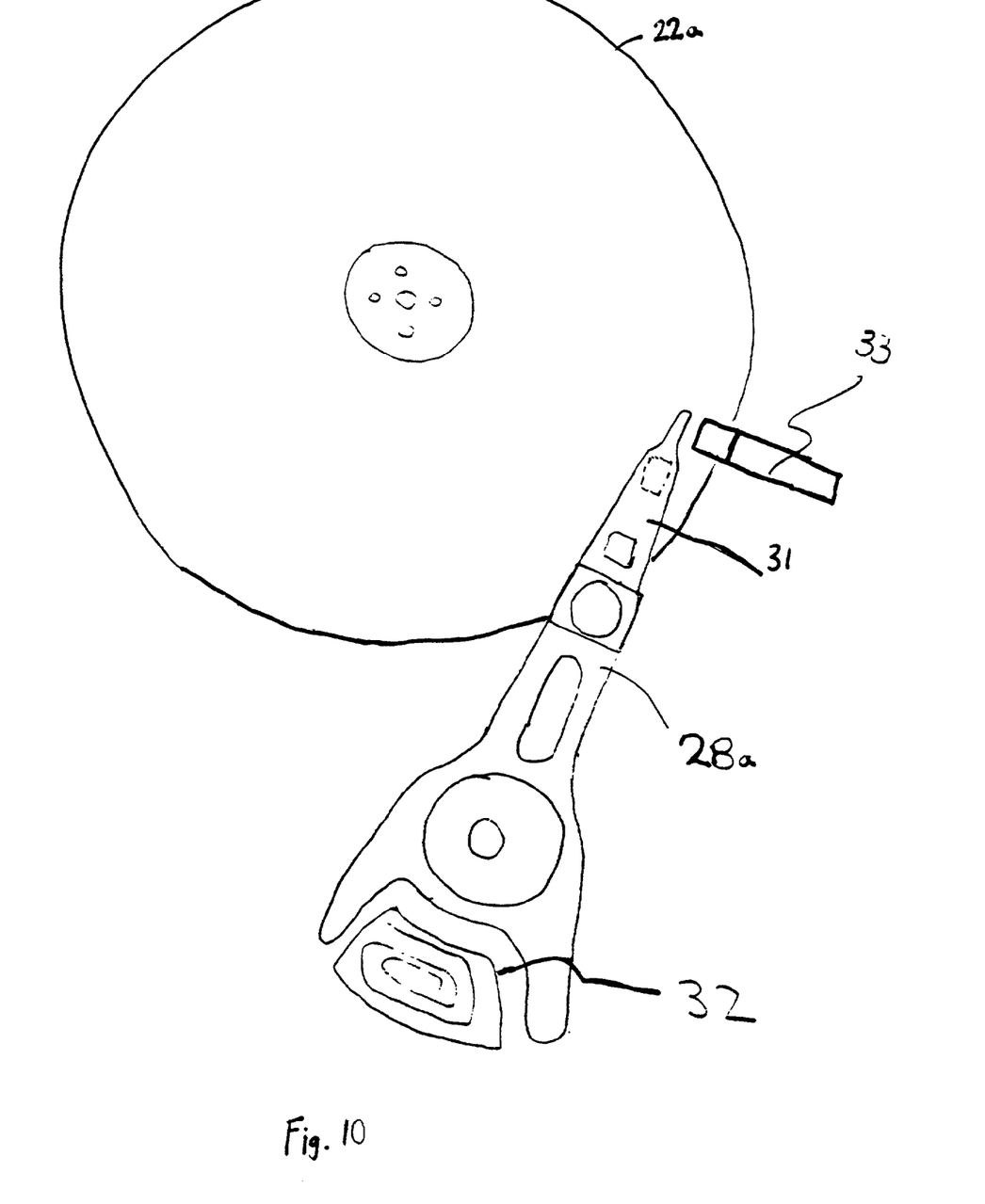
FIG. 10 is a diagram of an actuator arm adapted to hold a slider designed according to an embodiment of the present invention.

Referring to FIG. 10, each of the read/write heads 24a-h is mounted to a head suspension assembly of the respective actuator arm 28a-h by a flexure element and comprises a magnetic transducer 25 mounted to a slider 26 having an air bearing surface (not shown in this figure), all in a known manner. As discussed in further detail below, the sliders 26 cause the magnetic transducers 25 of the read/write heads 24a-h to "fly" above the surfaces of the respective storage disks 22a-d for non-contact operation of the disk drive system, as discussed above. When not in use, the voice coil motor 32 rotates the actuator arms 28a-h to a ramp 33, and a load beam of the actuator arms 28a-h moves up the load beam to a resting position away from the storage disk surfaces.

Although embodiments are specifically illustrated and described herein, it will be appreciated that modifications and variations of the present invention are covered by the above teachings and within the purview of the appended claims without departing from the spirit and intended scope of the invention. For example, though circular and semi-circular configurations are shown, other shapes for the SR pads can be used. Furthermore, though particular locations on the slider examples are shown, the location of the SR pads can be modified so as to optimize CSS performance.

What is claimed is:

1. A slider comprising:
   at least two air bearing surfaces formed during an etching process;
   at least two intermediate wings located along inner portions of the at least two air bearing surfaces;
   a shallow step area having a depth greater than said air bearing surfaces and separating leading edges of said air bearing surfaces from a leading edge of said slider and extending between said air bearing surfaces and beyond the leading edges of said air bearing surfaces, said shallow step formed during said etching process;
   a first stiction reduction pad located adjacent to one of said air bearing surfaces in said shallow step area and formed during an etching process; and
   a second and third stiction reduction pad located on the at least two intermediate wings.

2. A slider comprising:
   at least two air bearing surfaces formed during an etching process;
   at least two intermediate wings located along inner portions of the at least two air bearing surfaces;
   a shallow step area having a depth greater than said air bearing surfaces and separating leading edges of said air bearing surfaces from a leading edge of said slider and extending between said air bearing surfaces and beyond the leading edges of said air bearing surfaces;
   a first stiction reduction pad located adjacent to one of said air bearing surfaces in said shallow step area and formed during the same etching process; and
   a second and third stiction reduction pad located on the at least two intermediate wings.

3. The slider of claim 2, wherein said first stiction reduction pad includes a first adhesion layer and a first diamond-like carbon layer.

4. The slider of claim 3, wherein said first stiction reduction pad further includes a second adhesion layer and a second diamond-like carbon layer coupled to said first diamond-like carbon layer.

5. The slider of claim 3 where said first diamond-like carbon layer is partially etched to form said first stiction reduction pad.

6. The slider of claim 2 wherein said slider further includes a cavity between said air bearing surfaces and a third stiction reduction pad is placed in said cavity.

7. A head suspension assembly comprising:
   a slider including:
      at least two air bearing surfaces formed during an etching process;
      at least two intermediate wings located along inner portions of the at least two air bearing surfaces;
      a shallow step area having a depth greater than said air bearing surfaces and separating leading edges of said air bearing surfaces from a leading edge of said slider and extending between said air bearing surfaces and beyond the leading edges of said air bearing surfaces, said shallow step area and said air bearing surfaces being formed during said etching process;
      a first stiction reduction pad located adjacent to one of said air bearing surfaces and in said shallow step area and formed during an etching process; and
      a second and third stiction reduction pad located on the at least two intermediate wings.

8. A head suspension assembly comprising:
   a slider including:
      at least two air bearing surfaces formed during an etching process;
      at least two intermediate wings located along inner portions of the at least two air bearing surfaces;
      a shallow step area having a depth greater than said air bearing surface and separating leading edges of said air bearing surfaces from a leading edge of said slider and extending between said air bearing surfaces and beyond the leading edges of said air bearing surfaces;
      a first stiction reduction pad located adjacent to one of said air bearing surfaces and in said shallow step area and formed during the same etching process; and
      a second and third stiction reduction pad located on the at least two intermediate wings.

9. The head suspension assembly of claim 8, wherein said first stiction reduction pad includes a first adhesion layer and a first diamond-like carbon layer.

10. The head suspension assembly of claim 9, wherein said first stiction reduction pad further includes a second adhesion layer and a second diamond-like carbon layer coupled to said first diamond-like carbon layer.

11. The head suspension assembly of claim 9 where said first diamond-like carbon layer is partially etched to form said first stiction reduction pad.

12. The head suspension assembly of claim 8 wherein said slider further includes a cavity between said air bearing surfaces and said first stiction reduction pad is placed in said cavity.

13. A disk drive comprising:
   at least one disk capable of rotation;
   a head suspension assembly; and
   a slider coupled to said head suspension assembly, said slider including
      at least two air bearing surfaces formed during an etching process;
      at least two intermediate wings located along inner portions of the at least two air bearing surfaces;
      a shallow step area having a depth greater than said air bearing surface and separating leading edges of said air bearing surfaces from a leading edge of said slider and extending between said air bearing surfaces and beyond the leading edges of said air bearing surfaces, said shallow step area and said air bearing surfaces being formed during the same etching process; and
      a first stiction reduction pad located adjacent to one of said air bearing surfaces and in said shallow step area and formed during an etching process; and
      a second and third stiction reduction pad located on the at least two intermediate wings.

14. A disk drive comprising:
   at least one disk capable of rotation;
   a head suspension assembly; and a slider coupled to said head suspension assembly, said slider including
 at least two air bearing surfaces formed during an etching process;
 at least two intermediate wings located along inner portions of the at least two air bearing surfaces;
 a shallow step area having a depth greater than said air bearing surfaces and separating leading edges of said air bearing surfaces from a leading edge of said slider and extending between said air bearing surfaces and beyond the leading edges of said air bearing surfaces; and
 a first stiction reduction pad located adjacent to one of said air bearing surfaces and in said shallow step area and formed during the same etching process;
and
 a second and third stiction reduction pad located on the at least two intermediate wings.

15. The disk drive of claim 14, wherein said first stiction reduction pad includes a first adhesion layer and a first diamond-like carbon layer.

16. The disk drive of claim 15, wherein said first stiction reduction pad further includes a second adhesion layer and a second diamond-like carbon layer coupled to said first diamond-like carbon layer.

17. The disk drive of claim 15 where said first diamond-like carbon layer is partially etched to form said first stiction reduction pad.

18. The disk drive of claim 14 wherein said slider further includes a cavity between said air bearing surfaces and said first stiction reduction pad is placed in said cavity.

* * * * *